(No Model.) 2 Sheets—Sheet 1.

E. A. PORTER.
FEED CUTTER AND CRUSHER.

No. 454,790. Patented June 23, 1891.

WITNESSES
Chapman Fowler

INVENTOR
Eugene A. Porter,
by A. H. Evans & Co
Attorneys (No Model.) 2 Sheets—Sheet 2.
E. A. PORTER.
FEED CUTTER AND CRUSHER.
No. 454,790. Patented June 23, 1891.
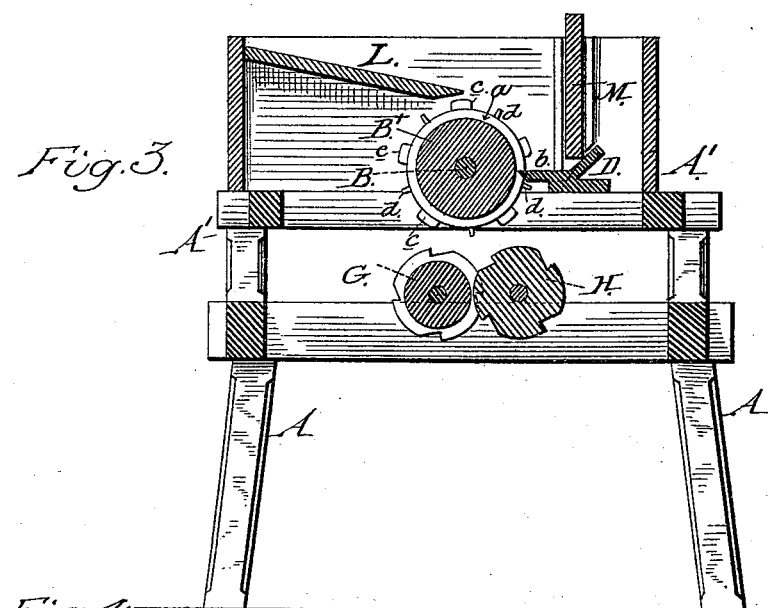
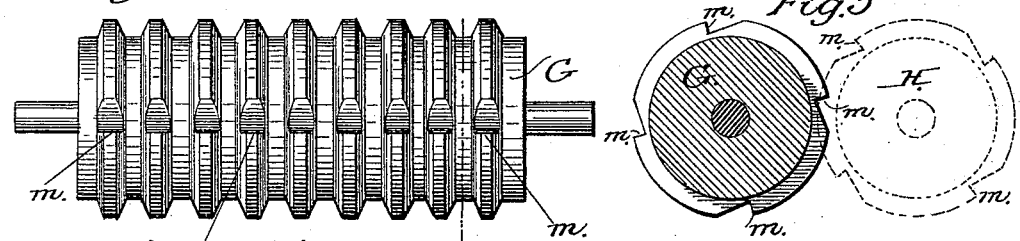
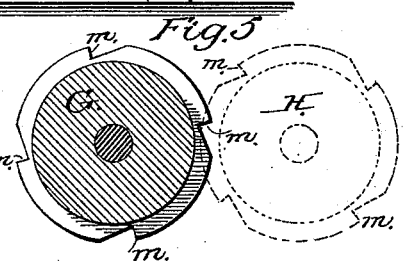
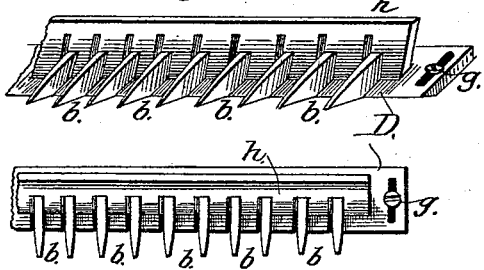
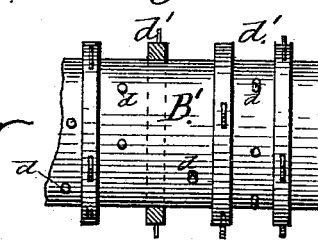
WITNESSES
INVENTOR
Eugene A. Porter,
by A. H. Evans & Co.
Attorneys

UNITED STATES PATENT OFFICE.

EUGENE A. PORTER, OF BOWLING GREEN, KENTUCKY.

FEED CUTTER AND CRUSHER.

SPECIFICATION forming part of Letters Patent No. 454,790, dated June 23, 1891.

Application filed October 8, 1890. Renewed June 1, 1891. Serial No. 394,654. (No model.)

*To all whom it may concern:*

Be it known that I, EUGENE A. PORTER, a citizen of the United States, residing at Bowling Green, in the county of Warren and State of Kentucky, have invented certain new and useful Improvements in Feed Cutters and Crushers, of which the following is a full and clear description, reference being had to the accompanying drawings, forming part of this specification, in which—

Figure 1:
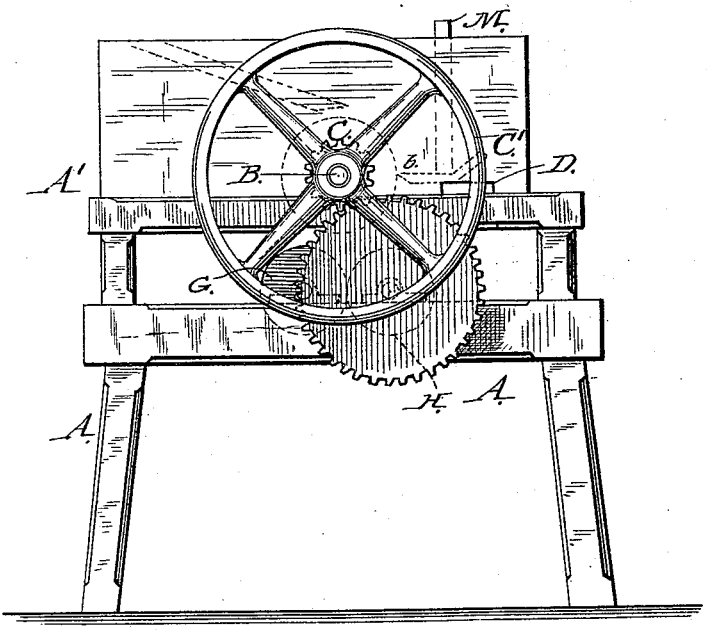
Figure 2:
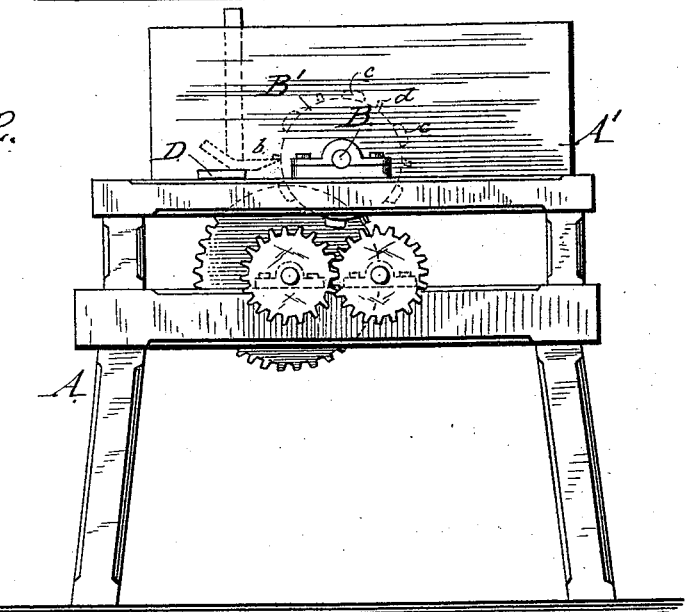

Figure 1 is a side elevation of the machine. Fig. 2 is an elevation from the opposite side. Fig. 3 is a longitudinal sectional view. Figs. 4 and 5 illustrate side and sectional views of one of the crushing-rollers. Figs. 6 and 7 are modifications to be referred to. Figs. 8 and 9 are details.

My invention relates to machines for preparing feed for stock purposes, the object of the invention being to provide an effective machine for cutting and crushing corn, oats, and like material in the sheaf, husk, or shuck, together with such portions of the stalks or straw as are suitable for the purposes intended.

The present invention is an improvement on my former patent, No. 360,044, granted March 29, 1887; and it consists in the constructions and combinations of devices, which I shall hereinafter fully describe and claim.

To enable others skilled in the art to which my invention appertains to make and use the same, I will now describe its construction and indicate the manner in which the same is carried out.

In the said drawings, A indicates a suitable frame-work for supporting the operating parts of the machine, and also for supporting a supplemental frame A', on which is journaled the shaft B, having suitable bearings and carrying the drum B', the pinion C, and the balance-wheel C', to which power may be applied in any suitable manner.

The drum or cylinder B is transversely grooved at $a$, so as to receive the points of the fingers $b$ on the finger-bar D, as I will hereinafter fully describe, and said drum or cylinder has secured throughout its periphery on the elevations between the grooves a series of pins $d$ and cutting-blades $c$, arranged substantially as shown, described, and claimed in my said former patent, and being used for the purpose of splitting the husks and stripping off the grain and breaking the cob or stalk into suitable pieces.

If desired, instead of grooving the cylinder or drum transversely, I may form around the periphery of the drum ribs $d'$, in which case the pins and cutting-blades will be arranged as shown in Fig. 7, the spaces between adjoining ribs forming the equivalent of the grooves in the cylinder or drum, as previously described.

The finger-bar D is secured at its ends to the main frame by screws $g$, (see Figs. 6, 8, and 9,) and by means of which the bar may be adjusted toward and from the cylinder or drum, and said bar is formed with a back piece $h$, set at an angle for the purpose of crowding the material into the space between itself and the drum or cylinder, the said bar being also provided with the forwardly-projecting fingers $b$, which enter the grooves in the drum or roller, thereby causing all of the material to be cut and torn to pieces in passing by them. By this construction it will be seen that as the material is fed from the hopper to the cylinder (which revolves at a high rate of speed) it is caught by the cutting-blades, and its husks, shells, or outer covering is split, the pins on said roller operating at the same time to feed the material to the fingers on the bar D and to reduce the pieces—such as ear-corn, cornstalks, &c.—so that they will pass between the fingers $b$ to the rolls beneath.

Instead of using the finger-bar D, (shown in Figs. 3, 8, and 9,) I may, if desired, employ a bar similar to that shown in Fig. 6, wherein the fingers are independent ones securely clamped between two parallel bars D' D", so that one or more may be adjusted forwardly and laterally to meet existing circumstances.

The bar shown in Fig. 6 is especially adapted to cut sheaf-oats, corn-fodder, straw, &c., in great quantities and when the use of crushing-rolls is not necessary, and by clamping the fingers between the bars in the manner before stated they may be adjusted to have their points enter deeply the grooves in the cylinder and drum.

The crushing-rolls G and H have their shafts mounted in the main frame, and they are transversely grooved and ribbed, so that the ribs of one roll will enter the grooves of the opposite roll, said ribs on one roll nearly touching the bottom of the grooves in the other. The ribs on the rollers are also grooved in lines parallel with the axis of said rolls, but these grooves are shallower than the transverse grooves. These longitudinal grooves have square walls or shoulders at *m* at one side and inclined walls at the opposite side, and the rolls are so geared that the longitudinal grooves on one roll will register about midway between similar grooves on the opposite roll. This arrangement prevents the occurrence of the open space which would occur if the longitudinal grooves registered with each other, and by making said grooves with the square shoulders on one side and revolving the rolls toward each other I am enabled to produce a force feed, the rolls feeding the material between themselves and crushing into finer pieces the material fed from the upper drum or cylinder and fingers.

The hopper L may be of any well-known construction and is fitted over the cylinder or drum, as shown, said hopper having a gate M, adjustable in vertical guides and removable to introduce or remove the finger-bar. The opening in the hopper extends nearly or quite the full length of the same, so as to permit sheaves of wheat, oats, &c., to be fed sidewise to the cylinder in contradistinction to endwise.

Having thus described my invention, what I claim as new, and desire to secure by Letters Patent, is—

1. The combination, with the frame having a supply-hopper, of a drum or cylinder having alternating elevations and grooves, a series of pins or teeth and cutting-blades arranged around the drum or cylinder, and a bar adjustably secured to said frame, having fingers projecting into the grooves of the drum or cylinder, substantially as herein described.

2. The combination, with the main frame and reducing-rolls in the lower part of said frame, of a cylinder transversely grooved and having pins or teeth and cutting-blades secured to its periphery, a removable and adjustable bar secured to said main frame and having fingers registering with and entering said grooves between the pins and cutting-blades, and a hopper over the cylinder or drum, having an opening for permitting the passage of a bound sheaf sidewise to said drum or cylinder, substantially as herein described.

EUGENE A. PORTER.

Witnesses:
T. W. THOMAS,
C. M. MCELROY.